(12) United States Patent
Inoue

(10) Patent No.: US 8,160,788 B2
(45) Date of Patent: Apr. 17, 2012

(54) IMPROPER START PREVENTING APPARATUS FOR VEHICLE

(75) Inventor: Hidefumi Inoue, Saitama-Ken (JP)

(73) Assignee: Bosch Corporation, Tokyo (JP)

( * ) Notice: Subject to any disclaimer, the term of this patent is extended or adjusted under 35 U.S.C. 154(b) by 476 days.

(21) Appl. No.: 12/498,836

(22) Filed: Jul. 7, 2009

(65) Prior Publication Data

US 2010/0010715 A1    Jan. 14, 2010

(30) Foreign Application Priority Data

Jul. 10, 2008    (JP) ................. 2008-180019

(51) Int. Cl.
*G06F 7/00*    (2006.01)
(52) U.S. Cl. .......................... 701/51; 180/272
(58) Field of Classification Search ............ 701/28, 701/70, 51, 95; 180/271, 272
See application file for complete search history.

(56) References Cited

U.S. PATENT DOCUMENTS

| | | | |
|---|---|---|---|
| 8,063,754 B2 * | 11/2011 | Tanida et al. ................. | 340/435 |
| 2002/0135469 A1 * | 9/2002 | Nakamura et al. ............ | 340/436 |
| 2005/0073136 A1 * | 4/2005 | Larsson et al. ................ | 280/735 |
| 2009/0058678 A1 * | 3/2009 | Matsuoka et al. ............ | 340/904 |
| 2009/0237644 A1 * | 9/2009 | Uechi ............................ | 356/29 |
| 2009/0273687 A1 * | 11/2009 | Tsukizawa et al. ........ | 348/222.1 |
| 2010/0049375 A1 * | 2/2010 | Tanimoto ........................ | 701/1 |

* cited by examiner

*Primary Examiner* — Thomas Black
*Assistant Examiner* — Sara Lewandroski
(74) *Attorney, Agent, or Firm* — Ronald E. Greigg

(57) ABSTRACT

If a control portion determines that the direction of travel of the vehicle with a range selected by the driver is different from the direction intended by the driver to move the vehicle, a vehicle inhibiting mechanism is activated to inhibit the movement of the vehicle. The activation of the vehicle inhibiting mechanism is based on a detection signal of the range selected by the driver from a range detecting portion, and a driver state detection signal from a driver state detecting portion.

16 Claims, 3 Drawing Sheets

IMPROPER START PREVENTING APPARATUS FOR VEHICLE

BACKGROUND OF THE INVENTION

1. Field of the Invention

The present invention relates to the technical field of improper start preventing apparatus for a vehicle that forcefully implements vehicle inhibition, that is, the inhibition of the start of a vehicle, vehicle stop or vehicle deceleration if a driver selects and sets the transmission range to a direction which is different from the direction intended by the driver to start the vehicle in driving at an extremely low velocity upon start or immediately after the start of the vehicle.

2. Description of the Related Art

Hitherto, in a vehicle such as an automobile, in order to start the vehicle, a driver selects and sets the transmission range to a desirable range position and depresses an accelerator pedal, whereby the vehicle can be started and be accelerated. A driver depresses a break pedal from a vehicle driving state, whereby the vehicle can be stopped or be decelerated.

In this case, in order to reverse an automatic transmission (or AT) vehicle, for example, a driver selects and sets the transmission range position to AT R-range and starts the vehicle. When R-range is set in this way, a notification that the vehicle will reverse is given to the inside of the vehicle (more specifically, an alarm therefor is triggered) Particularly in a large-sized vehicle such as a truck, a notification that the vehicle will reverse is also given to the outside of the vehicle.

Furthermore, if a driver sets to R-range, the line of sight of the driver is detected upon reverse of the vehicle, whereby performing the reverse operation only with a reverse auxiliary apparatus such as a back monitor can be prevented (refer to Patent Document 1).

[Patent Document 1] JP-A-2007-233795

The technology disclosed in Patent Document 1 assumes the case where the direction intended by a driver to start the vehicle agrees with the setting in the transmission range of the vehicle or the movement of the vehicle. In this case, the driver can perform a driving operation without being surprised and being confused.

However, in some cases, a driver might set to AT D-range from a vehicle stop state (such as N-range or P-range set state) improperly though the driver intends to start toward the rear of the vehicle and must have performed the AT operation to set to R-range actually. In those cases, the vehicle starts to the direction which is different from the direction intended by the driver, causing the vehicle to run out. In particular, a person who is not familiar with vehicle driving or an elderly person may be surprised and be confused by the start of his/her vehicle to the direction which is different from his/her intended direction and may depress the accelerator pedal instead of the brake pedal by mistake, causing the vehicle to roar away.

SUMMARY OF THE INVENTION

The invention was made in view of those situations, and it is an object of the invention to provide an improper start preventing apparatus for a vehicle, which can inhibit the movement of the vehicle if, in driving at an extremely low velocity at least either upon start of the vehicle or immediately after the start of the vehicle, the vehicle is attempting to move to the direction which is different from the direction intended by a driver to move the vehicle.

In order to solve the problem, there is provided according to an aspect of the invention an improper start preventing apparatus including a vehicle state detecting portion that detects the state of a vehicle, a range detecting portion that detects the selected transmission range, a driver state detecting portion that monitors the line of sight or attitude of a driver, vehicle inhibiting means for inhibiting the movement of the vehicles and a control portion that activates the vehicle inhibiting means to inhibit the movement of the vehicle if the control portion determines that the direction of travel of the vehicle with the range selected by the driver is different from the direction intended by the driver to move the vehicle on the basis of the selected range detection signal from the range detecting portion and the driver state detection signal from the driver state detecting portion.

The improper start preventing apparatus may further include a vehicle state detecting portion that detects the state of a vehicle, wherein the control portion also activates the vehicle inhibiting means on the basis of the vehicle state detection signal from the vehicle state detecting portion.

The improper start preventing apparatus may further include at least one of a front obstacle detecting portion that detects an obstacle in front of a vehicle and a rear obstacle detecting portion that detects an obstacle in rear of a vehicle, wherein the control portion also activates the vehicle inhibiting means on the basis of the obstacle detection signal from at least one of the front obstacle detecting portion and the rear obstacle detecting portion.

The improper start preventing apparatus may further include a vehicle positional information detecting portion that detects the present position of a vehicle and the direction of the vehicle, wherein the control portion also activates the vehicle inhibiting means on the basis of the vehicle positional information detection signal from the vehicle positional information detecting portion.

The improper start preventing apparatus may further include alert means for notifying that the vehicle inhibiting means is operating and range position improper-selection notifying means for notifying that the position of the range has been selected improperly.

With the improper start preventing apparatus according to the invention configured as described above, when a driver upon start of a vehicle selects and sets the transmission range position to the direction which is different from the direction intended by the driver to start the vehicle, the activation of the vehicle inhibiting means can inhibit the movement of the vehicle, that is, the start of the vehicle. This can prevent the start of the vehicle to the direction unintended by the driver upon start of the vehicle. Therefore, the start of the vehicle can be securely inhibited even when the vehicle drives in the direction unintended by the driver immediately after the start of the vehicle and the driver is surprised and is confused to depress the accelerator pedal instead of the brake pedal by mistake.

The activation of the vehicle inhibiting means can inhibit the vehicle, that is, stop or decelerate the vehicle even when the vehicle starts because it is determined that the direction of the starting vehicle agrees with the driver's intention but the driver immediately notices that the direction of the start of the vehicle is wrong in driving at an extremely low velocity immediately after the start of the vehicle. This can prevent the driving of the vehicle to the direction unintended by the driver in driving at an extremely low velocity immediately after the start of the vehicle.

Furthermore, when the control portion determines that the driver is attempting to start the vehicle to the direction with an obstacle though there is the obstacle at least in front or rear of the vehicle in driving at a low velocity upon start of the vehicle or immediately after the start, the control portion activates the vehicle inhibiting means to implement the inhibition of the vehicle, that is, the inhibition of the start of the vehicle or the stop or deceleration of the vehicle. This can prevent the vehicle from the collision with the obstacle in driving at an extremely low velocity upon start of the vehicle or immediately after the start even when the driver does not recognize the obstacle at least in either front or rear of the vehicle.

Furthermore, in driving at a low velocity upon start of the vehicle or immediately after the start, the control portion recognizes the position of the vehicle and the direction of the vehicle on the basis of the vehicle positional information and the map information of the present vehicle position from the vehicle positional information detecting portion. Then, if the control portion determines that the driver improperly selects the range position to start the vehicle in the direction to a no-entry area though, for example, there is the no-entry area in either front or rear of the vehicle on the map, the vehicle inhibiting means is activated to implement the vehicle inhibition, that is, the inhibition of the start of the vehicle or the stop or deceleration of the vehicle. This can prevent the vehicle from entering to the no-entry area even when the driver does not recognize the no-entry area in front or rear of the vehicle.

Furthermore, the driver can learn from the alert means and range position improper-selection notifying means that the start of the vehicle is disabled because the selected transmission range is improper and the reason.

DESCRIPTION OF THE PREFERRED EMBODIMENT

With reference to drawings, an embodiment of the invention will be described below.

Figure 1:
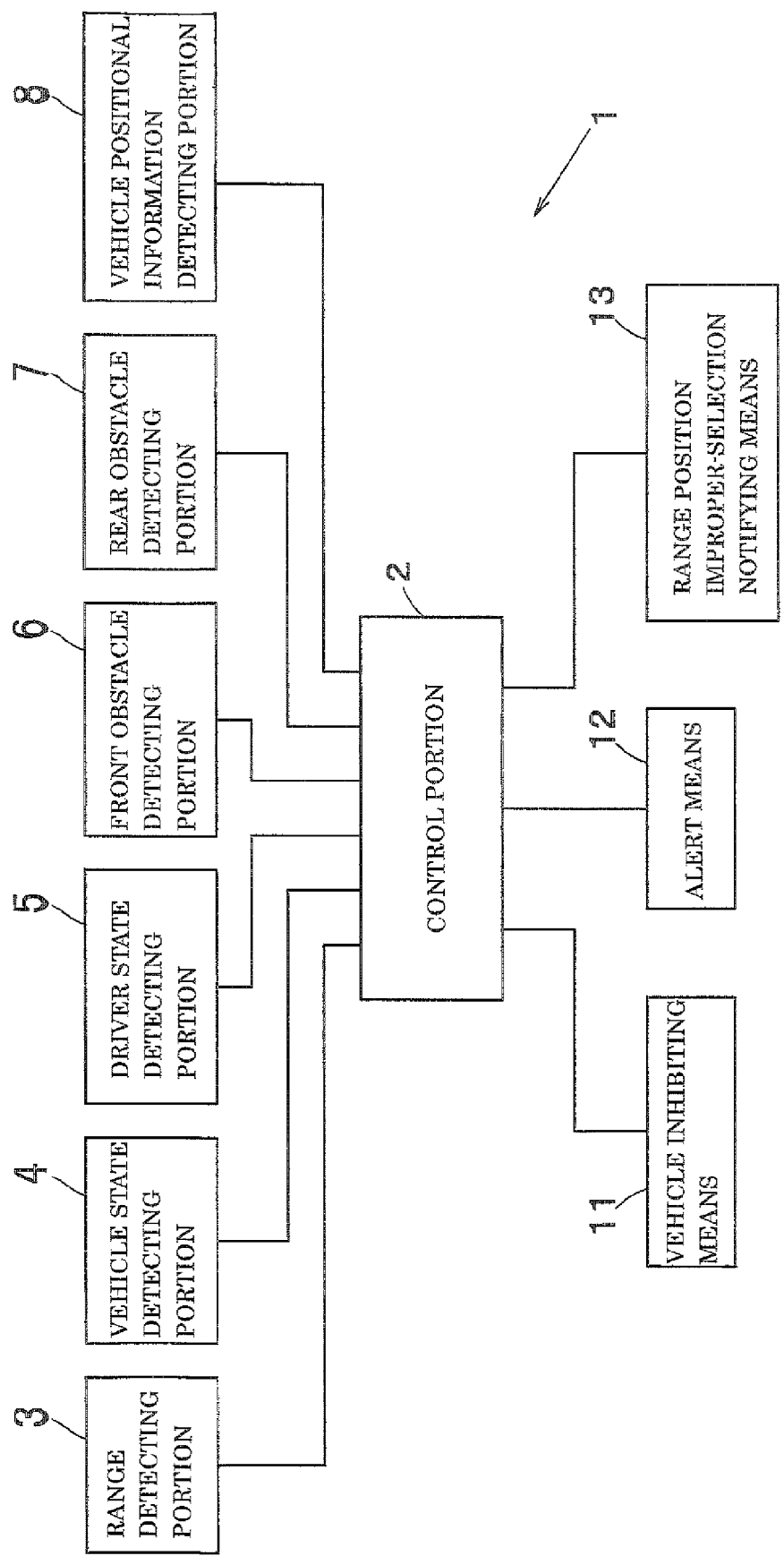
FIG. 1 is a block diagram showing an example of an embodiment of the improper start preventing apparatus of the invention.

FIG. 1 is a block diagram showing an example of an embodiment of the improper start preventing apparatus according to the invention.

As shown in FIG. 1, an improper start preventing apparatus 1 in this example is applied to an automatic transmission (or AT) vehicle and includes a control portion 2 having an electronic control portion. The improper start preventing apparatus 1 includes a range detecting portion 3 that detects the AT range positions, a vehicle state detecting portion 4 that detects the state (such as the direction of travel and velocity) of a vehicle, a driver state detecting portion 5 that monitors the line of sight and/or attitude of a driver, a front obstacle detecting portion (or front obstacle monitor) 6 that detects an obstacle in front of a vehicle, a rear obstacle detecting portion (or rear obstacle monitor) 7 that detects an obstacle in rear of a vehicle, and a vehicle positional information detecting portion 8 that detects the present position of the vehicle and the direction of the vehicle, which are connected to the control portion 2.

The range detecting portion 3 can employ a range sensor which is conventionally provided in an AT vehicle for indicating the selected range position on the instrumental panel The information on the range position detected by the range detecting portion 3 is input to the control portion 2 by an electric signal. The vehicle state detecting portion 4 can employ a velocity sensor which is conventional provided for indicating the vehicle velocity on the instrumental panel. The information on the direction of travel of the vehicle and vehicle velocity detected by the vehicle state detecting portion 4 is input to the control portion 2 by an electric signal.

Figure 2:
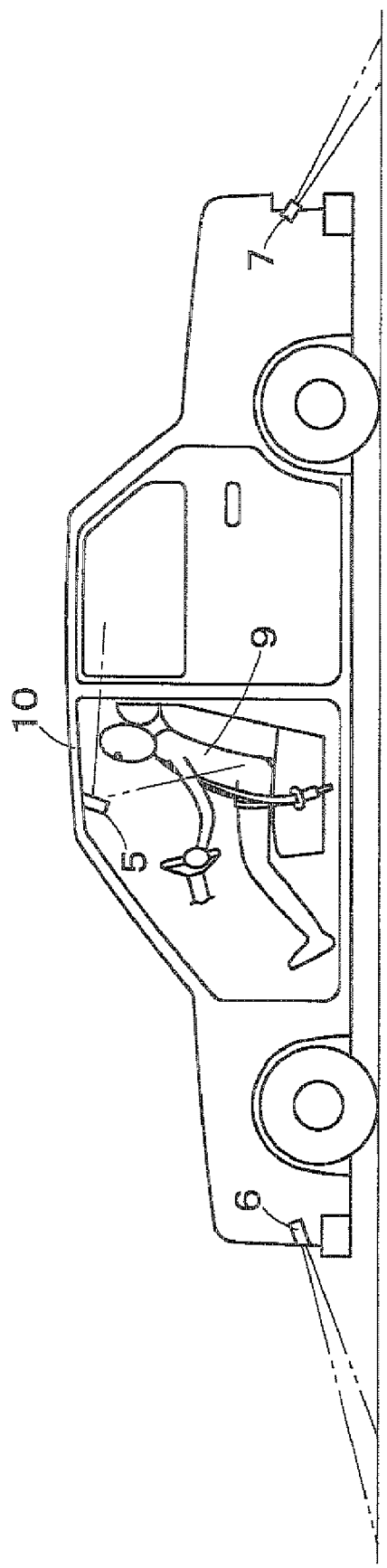
FIG. 2 is a diagram illustrating the position of a vehicle where the detecting portion of this embodiment is to be attached.

The driver state detecting portion 5 may include a camera, for example, that photographs the face and/or attitude of a driver. As shown in FIG. 2, the driver state detecting portion 5 is attached to the upper part of the vehicle body 10 such that the whole body or at least upper body of a driver 9 can be photographed. The information on the driver state photographed by the driver state detecting portion 5 is input to the control portion 2 by an electric signal. The front obstacle detecting portion 6 may include a camera, for example, that photographs the front of the vehicle. As shown in FIG. 2, the front obstacle detecting portion 6 is attached to the front grille or the vehicle body 10 near the front bumper such that an obstacle in front of the vehicle can be detected. The information on an obstacle in front of the vehicle, which is detected by the front obstacle detecting portion 6, is input to the control portion 2 by an electric signal. The rear obstacle detecting portion 7 may include a camera, for example, that photographs the rear of the vehicle. As shown in FIG. 2, the rear obstacle detecting portion 7 is attached to the trunk lid or the vehicle body 10 near the rear bumper such that an obstacle in rear of the vehicle can be detected. The information on an obstacle in rear of the vehicle, which is detected by the rear obstacle detecting portion 7, is input to the control portion 2 by an electric signal. The vehicle positional information detecting portion 8 may employ a navigation system which is conventionally provided on the instrumental panel. The vehicle positional information of the present vehicle position and map information on an area including the vehicle position, which are detected by the navigation system are input to the control portion 2 by an electric signal.

As shown in FIG. 1, the improper start preventing apparatus 1 in this example further includes vehicle inhibiting means 11, alert means 12 and range position improper-selection notifying means 13, which are connected to the control portion 2. The vehicle inhibiting means 11 inhibits the movement of a vehicle, such as the inhibition of the start of the vehicle and the stop or deceleration of the vehicle. The vehicle inhibiting means 11 may be, for example, accelerator pedal opening operation control means for limiting the accelerator pedal position or inhibits the opening operation on the accelerator pedal, ignition switch control means for turning off the ignition switch or an automatic brake apparatus that applies a braking force to the vehicle. The accelerator pedal opening operation control means, ignition switch control means and automatic brake apparatus may be those which are conventionally well known and common. The alert means 12 notifies a driver of that the vehicle inhibiting means 11 is operating and may be a conventionally well known and common alert apparatus with functions for audio output and/or screen display. The range position improper-selection notifying means 13 notifies that the selected range position is improper and may be a conventionally well known and common alert device with functions for audio output and/or screen display.

When a driver is seated on a vehicle sheet and when the vehicle starts or is travelling slightly, the improper start preventing apparatus I is activated. More specifically, the control portion 2 receives the input of the detection signals from the detecting portions 3, 4, 5, 6, 7 and 8. In other words, the detection signal of the AT range position selected by a driver from the range detecting portion 3 the detection signal of the state (such as the direction of travel and vehicle velocity of the vehicle) from the vehicle state detecting portion 4, the detection signal of the state of a driver, such as the line of sight and attitude of a driver from the driver state detecting portion 5, the detection signal of an obstacle in front of the vehicle from the front obstacle detecting portion 6 and the detection signal of an obstacle in rear of the vehicle from the rear obstacle detecting portion 7 are input to the control portion 2.

Then, if the vehicle velocity V km/h is higher than 0 km/h and is equal to or lower than 5 km/h (0 km/h<V km/h≦5 km/h), the control portion 2 compares the AT range position selected by a driver and the state of the driver and determines whether the range position and the state of the driver agree or not. If the control portion 2 determines that the range position and the state of the driver do not agree, a control signal is output to the vehicle inhibiting means 11, alert means 12 and range position improper-selection notifying means 13.

For example, when the AT range position selected by the driver upon start of the vehicle is D-range but the line of sight or face of the driver directs to the rear of the vehicle, the control portion 2 determines that the range position and the state of the driver disagree and outputs control signals to the vehicle inhibiting means 11, alert means 12 and range position improper-selection notifying means 13. Thus, the vehicle inhibiting means 11 is activated, and even when the driver depresses the accelerator pedal, the depression of the accelerator pedal by the driver is interfered, whereby the start of the vehicle is forcefully inhibited. Therefore, the vehicle is inhibited to start to the front under the state that the driver directs to the rear of the vehicle. The alert means 12 is further activated, whereby the driver is notified of the activation of the vehicle inhibiting means 11. In addition, the range position improper-selection notifying means 13 notifies the driver of that the range position has been selected improperly. In this way, the vehicle is not started when a driver selects and sets the range position to D-range, that is, the advance range improperly upon start of the vehicle though the driver intends to reverse the vehicle. This can prevent the start of the vehicle to the direction which is not intended by the driver upon start of the vehicle. Furthermore, the driver can learn from the alert means 12 and range position improper-selection notifying means 13 that the improperly selected range disables the start of the vehicle.

The same is true for the case where a range for the advance direction excluding D-range is selected. Conversely, the vehicle is not started also when a driver selects and sets the AT range position to R-range, that is, the reverse range improperly upon start of the vehicle though the driver intends to advance the vehicle. This can securely prevent the start of the vehicle upon start of the vehicle even though the driver is confused to depress the accelerator pedal improperly instead of the brake pedal when the vehicle starts to the direction not intended by the driver.

It may be determined upon start of the vehicle that the intention of a driver and the selected range position agree and, after the vehicle starts, the driver may notice immediately that the direction of the start of the vehicle is improper and may turn to the direction of the start of the vehicle. In this case, the velocity of the vehicle is still 5 km/h or lower, which is an extremely low vehicle velocity. Under this state, the control portion 2 determines that the drivers intention upon start of the vehicle and the driver's intention after the start of the vehicle are different and outputs control signals to the vehicle inhibiting means 11, alert means 12 and range position improper selection notifying means 13. Thus, in the same manner as described above, the vehicle inhibiting means 11 is activated to forcefully stop or decelerate the vehicle. Furthermore, the alert means 12 and range position improper-selection notifying means 13 are activated, whereby the driver can learn the reason why (or cause of that) the vehicle is stopped or decelerated.

Furthermore, upon start of a vehicle, the detection signal of an obstacle in front of the vehicle is input from the front obstacle detecting portion 6 to the control portion 2, whereby the control portion 2 recognizes that there is an obstacle in front of the vehicle. Under this state, when the driver selects D-range without knowing the existence of the obstacle, a D-range selection detection signal is input from the range detecting portion 3 to the control portion 2. Then, the control portion 2 determines that the driver intends to start the vehicle in the advance direction though there is an obstacle in front of the vehicle and outputs control signals to the vehicle inhibiting means 11, alert means 12 and range position improper-selection notifying means 13. Therefore, in the same manner as described above, the vehicle inhibiting means 11 is activated to forcefully inhibit the start of the vehicle, and the alert means 12 and range position improper-selection notifying means 13 are activated, whereby the driver can learn the reason (or cause) for the inhibition of the start of the vehicle, the stop of the vehicle or the deceleration of the vehicle This can prevent the collision with the obstacle in front of the vehicle.

Even when there is an obstacle in front of a vehicle in advance driving at an extremely low velocity that is equal to or lower than 5 km/h immediately after the start of the vehicle and if the control portion 2 recognizes that there is an obstacle in front of the vehicle, the control portion 2 in the same manner as described above outputs control signals to the vehicle inhibiting means 11, alert means 12 and range position improper-selection notifying means 13. Therefore, in the same manner as described above, the vehicle inhibiting means 11 is activated, whereby the vehicle is stopped or is decelerated forcefully. Furthermore, the alert means 12 and range position improper-selection notifying means 13 are activated, whereby the driver can learn the reason (or cause) for the inhibition of the start of the vehicle, the stop of the vehicle or the deceleration of the vehicle. In the same manner as described above, this can prevent the collision with the obstacle in front of the vehicle.

Notably, in the same manner as described above, when the rear obstacle detecting portion 7 detects an obstacle in rear of the vehicle and when a driver selects R-range, the vehicle inhibiting means 11 is activated to inhibit the start of the vehicle or stop or decelerate the vehicle. Furthermore, the alert means 12 and range position improper-selection notifying means 13 are activated, whereby the driver can learn the reason (or cause) for the inhibition of the start of the vehicle, the stop of the vehicle or the deceleration of the vehicle. This can prevent the collision with the obstacle in rear of the vehicle.

Still further, upon start of the vehicle, the vehicle positional information detecting portion 8 (such as a navigation system) inputs the detection signals of the vehicle positional information of the present vehicle position and the map information to the control portion 2. Thus, the control portion 2 recognizes the vehicle position and the direction of the vehicle on the map. Then, for example, when there is a no-entry area such as a cliff or the sea on the rear side of the vehicle on the map but the driver selects R-range improperly without knowing the existence of the cliff or the sea, the range detecting portion 3 inputs the R-range selection detection signal to the control portion 2 Then, the control portion 2 determines that the driver is attempting to start the vehicle in the reverse direction though there is a cliff or the sea in rear of the vehicle and outputs control signals to the vehicle inhibiting means 11, alert means 12 and range position improper-selection notifying means 13. Therefore, in the same manner as described above, the vehicle inhibiting means 11 is activated to forcefully inhibit the start of the vehicle. This can prevent the vehicle from tumbling from a cliff or entering to the sea.

If the control portion 2 recognizes that there is a cliff or the sea in rear of the vehicle in reverse driving at an extremely low velocity that is equal to or lower than 5 km/h immediately after the start of the vehicle, the control portion 2, in the same manner as described above, outputs control signals to the vehicle inhibiting means 11, alert means 12 and range position improper-selection notifying means 13. Therefore, in the same manner as described above, the vehicle inhibiting means 11 is activated to forcefully stop or decelerate the vehicle, and the alert means 12 and range position improper-selection notifying means 13 are activated, whereby the driver can learn the reason (or cause) for the inhibition of the start of the vehicle, the stop of the vehicle or the deceleration of the vehicle. Thus, as described above, this can prevent the vehicle from tumbling from a cliff or entering to the sea.

Notably, the same is true for the case where the map shows there is a cliff or the sea on the front side of the vehicle in advance driving at a low velocity equal to or lower than 5 km/h upon start of the vehicle or immediately after the start of the vehicle to the front.

If the front obstacle detecting portion 6 and rear obstacle detecting portion 7 detect obstacles in front of the vehicle and in rear of the vehicle and if the vehicle positional information detecting portion 8 detects that there is a no-entry area such as a cliff or the sea in the direction of travel of the vehicle, the control portion 2 outputs control signals to the vehicle inhibiting means 11, alert means 12 and range position improper-selection notifying means 13 so as to activate the means 9, alert means 12 and range position improper-selection notifying means 13 even when the vehicle is driving at a higher vehicle velocity than 5 km/h.

If the inhibition of the vehicle is no longer necessary, a reset signal is input to the control portion 2. The reset signal ends the activation of the improper start preventing apparatus 1.

Figure 3:
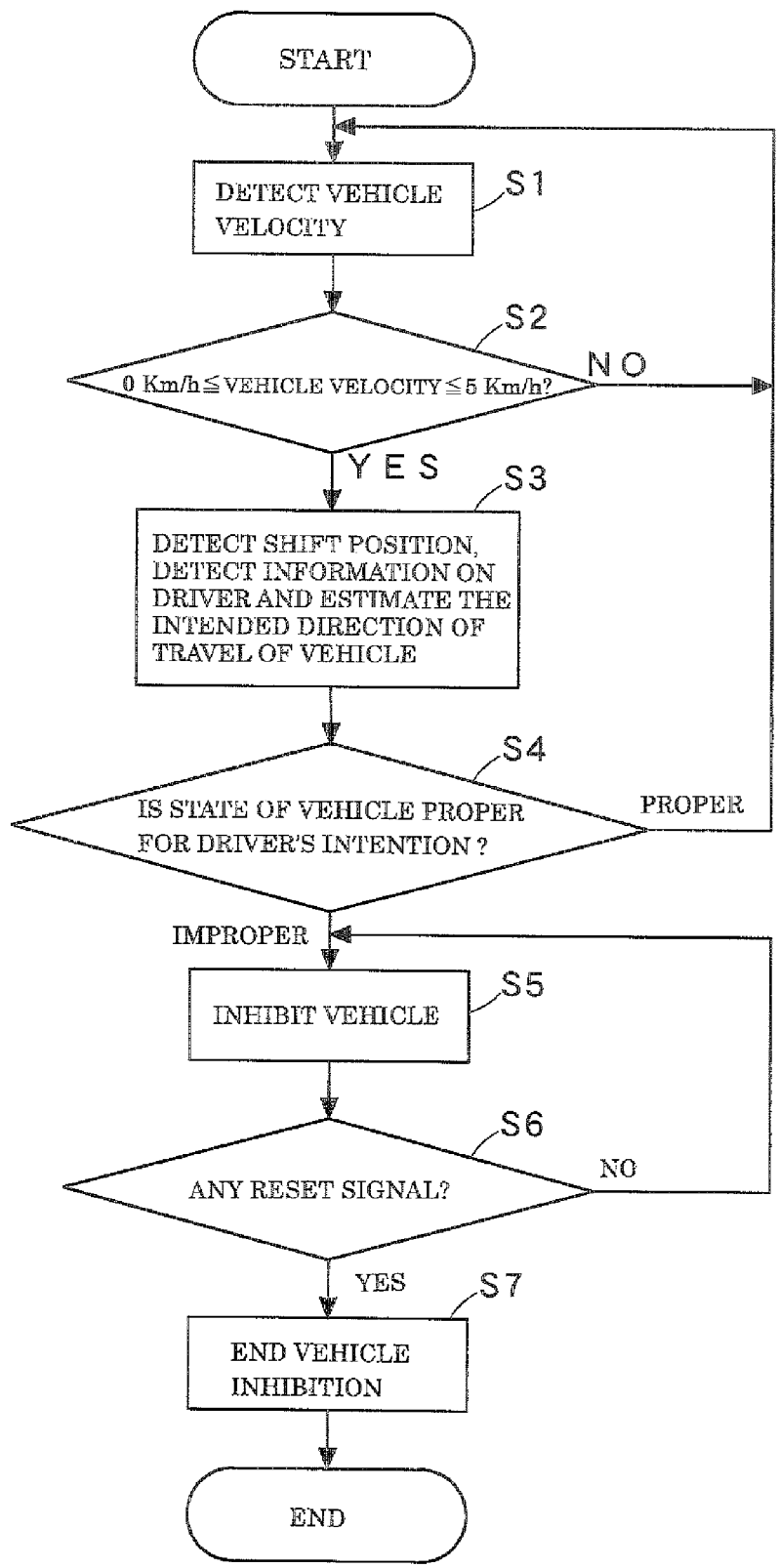
FIG. 3 is a diagram showing flow of an example of the control that prevents the unintended start of a vehicle by the improper start preventing apparatus according to the invention.

FIG. 3 is a diagram showing a flow of an example of the control that prevents the improper start preventing apparatus according to the invention.

As shown in FIG. 3, under the improper start prevention control for a vehicle in this example, the vehicle velocity is detected in step S1. Next, in step S2, whether the detected vehicle velocity is higher than 0 km/h and is equal to or lower than 5 km/h or not is determined. If the vehicle velocity is not higher than 0 km/h or is equal to or lower than 5 km/h, the processing returns to step S1, and the operations in step S1 and subsequent steps are repeated. If it is determined in step S2 that the vehicle velocity is higher than 0 km/h and is equal to or lower than 5 km/h, the range position selected by the driver is detected in step S3, and the state of the driver (such as the line of sight and attitude of the driver) is detected. Then, from the detection information on the state of the driver, the direction of travel intended by the driver (that is, the driver's intention) can be estimated.

Next, in step S4, whether the state of the vehicle (such as the selected range position or the driving direction of the vehicle) is proper for the driver's intention or not (that is, whether they agree or not) is determined. If it is determined that the state of the vehicle is proper for the driver's intention, the processing returns to step S1, and the operations in step S1 and subsequent steps are repeated. If it is determined that the state of the vehicle is not proper for the drivers intention, the vehicle inhibiting means 11 implements the inhibition of the vehicle in step S5. Furthermore, the alert means 12 implements the alert, and the range position improper-selection notifying means notifies the range position erroneous selection.

Next, in step S6, whether the reset signal has been input or not is determined. In other words, if it is determined that no reset signals have been input, the processing returns to the operation of the vehicle inhibition in step S5, and the operations in step SS and subsequent steps are repeated. If it is determined in step S6 that the reset signal has been input, the inhibition of the vehicle by the vehicle inhibiting means 11 ends in step S7.

With the improper start preventing apparatus 1 in this example, when a driver upon start of the vehicle selects and sets the AT range position in the direction which is different from the starting direction intended by the driver to start the vehicle, the activation of the vehicle inhibiting means 11 inhibits the movement of the vehicle, that is, inhibits the start of the vehicle. This can prevent the start of the vehicle in the direction which is not intended by the driver upon start of the vehicle. Furthermore, the driver can learn from the alert means 12 and range position improper-selection notifying means 13 that the improperly selected AT range disables the start of the vehicle and the reason Therefore, the start of the vehicle can be securely prevented upon start of the vehicle even when the vehicle starts in an unintended direction and the driver is confused to depress the accelerator pedal instead of the brake pedal by mistake.

The activation of the vehicle inhibiting means 11 can inhibit the vehicle, that is, stop or decelerate the vehicle even when the vehicle starts because it is determined that the direction of the starting vehicle agrees with the driver's intention but the driver immediately notices that the direction of the start of the vehicle is wrong in driving at an extremely low velocity immediately after the start of the vehicle. This can prevent the driving of the vehicle to the direction which is not intended by the driver in driving at an extremely low velocity immediately after the start of the vehicle. Furthermore, the driver can learn from the alert means 12 and range position improper-selection notifying means 13 the reason for the vehicle stop or vehicle deceleration. Even when the vehicle drives in an unintended direction immediately after the start of the vehicle and the driver is confused to depress the accelerator pedal by mistake instead of the brake pedal, the vehicle can further be securely stopped or decelerated.

Furthermore, while a vehicle is driving at a low velocity upon start of the vehicle or immediately after the start, if the control portion 2 determines that there is an obstacle in either front or rear of the vehicle but the driver is attempting to start the vehicle in the direction with the obstacle, the vehicle inhibiting means 11 is activated, whereby the vehicle inhibition, that is, the inhibition of the start of the vehicle or the stop or deceleration of the vehicle is implemented. Thus, even when a driver does not recognize an obstacle at least in either front or rear of the vehicle, the collision of the vehicle with the obstacle can be prevented while the vehicle is driving at an extremely low velocity upon start of the vehicle and immediately after the start.

Still further, while a vehicle is driving at a low velocity upon start of the vehicle or immediately after the start, the control portion 2 recognizes the position of the vehicle and the direction of the vehicle on the basis of the vehicle positional information of the present vehicle position and the map information from the vehicle positional information detecting portion 8 (such as a navigation system). Then, if the control portion 2 determines that there is a no-entry area such as a cliff or the sea in either front or rear of the vehicle on the map but the driver has selected the range position improperly so as to start the vehicle in the direction of the no-entry area, the vehicle inhibiting means 11 is activated to inhibit the vehicle, that is, inhibit the start of the vehicle or stop or decelerate the vehicle. This can prevent the vehicle from entering to the no-entry area even if the driver does not recognize the no-entry area in either front or rear of the vehicle.

The improper start preventing apparatus according to the invention is suitably applicable to an improper start preventing apparatus for a vehicle, which forcefully implements the inhibition of the vehicle, that is, the inhibition of the start of the vehicle or the vehicle stop or vehicle deceleration when the driver selects and sets the transmission range to the direction which is different from the direction intended by the driver to start the vehicle while the vehicle is driving at an extremely low velocity upon start of the vehicle or immediately after the start of the vehicle.

What is claimed is:

1. An improper start preventing apparatus comprising:
   a range detecting portion that detects a selected transmission range;
   a driver state detecting portion that monitors a line of sight or attitude of a driver;
   a vehicle inhibiting mechanism which is capable of inhibiting a movement of a vehicle; and
   a control portion that activates the vehicle inhibiting mechanism to inhibit the movement of the vehicle if the control portion determines that a direction of travel of the vehicle with the transmission range selected by the driver is different from a direction intended by the driver to move the vehicle on the basis of a selected range detection signal from the range detecting portion and a driver state detection signal from the driver state detecting portion.

2. The improper start preventing apparatus according to claim 1, further comprising a vehicle state detecting portion that detects a state of a vehicle, wherein the control portion also activates the vehicle inhibiting mechanism on a basis of a vehicle state detection signal from the vehicle state detecting portion.

3. The improper start preventing apparatus according to claim 1, further comprising at least one of a front obstacle detecting portion that detects an obstacle in front of a vehicle and a rear obstacle detecting portion that detects an obstacle in rear of a vehicle, wherein the control portion also activates the vehicle inhibiting mechanism on a basis of an obstacle detection signal from at least one of the front obstacle detecting portion and the rear obstacle detecting portion.

4. The improper start preventing apparatus according to claim 1, further comprising a vehicle positional information detecting portion that detects a present position of a vehicle and the direction of the vehicle, wherein the control portion also activates the vehicle inhibiting mechanism on a basis of a vehicle positional information detection signal from the vehicle positional information detecting portion.

5. The improper start preventing apparatus according to claim 1, further comprising an alert mechanism capable of notifying that the vehicle inhibiting mechanism is operating and a range position improper-selection notifying mechanism capable of notifying that a range position has been selected improperly.

6. The improper start preventing apparatus according to claim 2, further comprising at least one of a front obstacle detecting portion that detects an obstacle in front of a vehicle and a rear obstacle detecting portion that detects an obstacle in rear of a vehicle, wherein the control portion also activates the vehicle inhibiting mechanism on a basis of an obstacle detection signal from at least one of the front obstacle detecting portion and the rear obstacle detecting portion.

7. The improper start preventing apparatus according to claim 2, further comprising a vehicle positional information detecting portion that detects a present position of a vehicle and the direction of the vehicle, wherein the control portion also activates the vehicle inhibiting mechanism on a basis of a vehicle positional information detection signal from the vehicle positional information detecting portion.

8. The improper start preventing apparatus according to claim 2, further comprising an alert mechanism capable of notifying that the vehicle inhibiting mechanism is operating and a range position improper-selection notifying mechanism capable of notifying that a range position has been selected improperly.

9. The improper start preventing apparatus according to claim 3, further comprising a vehicle positional information detecting portion that detects a present position of a vehicle and the direction of the vehicle, wherein the control portion also activates the vehicle inhibiting mechanism on a basis of a vehicle positional information detection signal from the vehicle positional information detecting portion.

10. The improper start preventing apparatus according to claim 3, further comprising an alert mechanism capable of notifying that the vehicle inhibiting mechanism is operating and a range position improper-selection notifying mechanism capable of notifying that a range position has been selected improperly.

11. The improper start preventing apparatus according to claim 4, further comprising an alert mechanism capable of notifying that the vehicle inhibiting mechanism is operating and a range position improper-selection notifying mechanism capable of notifying that a range position has been selected improperly.

12. The improper start preventing apparatus according to claim 6, further comprising a vehicle positional information detecting portion that detects a present position of a vehicle and the direction of the vehicle, wherein the control portion also activates the vehicle inhibiting mechanism on a basis of a vehicle positional information detection signal from the vehicle positional information detecting portion.

13. The improper start preventing apparatus according to claim 6, further comprising an alert mechanism capable of notifying that the vehicle inhibiting mechanism is operating and a range position improper-selection notifying mechanism capable of notifying that a range position has been selected improperly.

14. The improper start preventing apparatus according to claim 7, further comprising an alert mechanism capable of notifying that the vehicle inhibiting mechanism is operating and a range position improper-selection notifying mechanism capable of notifying that a range position has been selected improperly.

15. The improper start preventing apparatus according to claim 9, further comprising an alert mechanism capable of notifying that the vehicle inhibiting mechanism is operating and a range position improper-selection notifying mechanism capable of notifying that a range position has been selected improperly.

16. The improper start preventing apparatus according to claim 12, further comprising an alert mechanism capable of notifying that the vehicle inhibiting mechanism is operating and a range position improper-selection notifying mechanism capable of notifying that a range position has been selected improperly.

* * * * *